UNITED STATES PATENT OFFICE.

EMIL FISCHER, OF BERLIN, GERMANY, ASSIGNOR TO FARBENFABRIKEN VORM. FRIEDR. BAYER & CO., OF ELBERFELD, GERMANY, A CORPORATION OF GERMANY.

BROMIN DERIVATIVE OF FATTY ACIDS.

No. 848,230.   Specification of Letters Patent.   Patented March 26, 1907.

Application filed June 23, 1906. Serial No. 323,037.

*To all whom it may concern:*

Be it known that I, EMIL FISCHER, professor of chemistry, a citizen of the German Empire, residing at Berlin, Kingdom of Prussia, Germany, have invented new and useful Improvements in Bromin Derivatives of Fatty Acids, of which the following is a specification.

I have found that the alkaline-earth and magnesium salts of monobromin-substituted high-molecular fatty acids—such as monobromobehenic acid, monobromostearic acid, or the like—possess valuable therapeutic properties. These salts, which are solid substances, have no taste and are valuable substitutes for potassium bromid, an average dose being from one to four grams.

My new preparations are obtained by converting the free monobromin-substituted high-molecular fatty acids or their alkaline salts into their salts with alkaline-earth metals or magnesium.

The monobromin-substituted high-molecular fatty acids are prepared by treating with hydrogen bromid the high-molecular acids of the oleic series, such as oleic acid, erucic acid, brassidic acid, elaidic acid, or the like.

The preparation of the above-mentioned salts of the bromin derivatives of the high-molecular fatty acids must be carried out in such a manner that the resulting salts are neutral, because salts containing free acid have a faint odor and taste.

The preparation of the above-mentioned salts of monobromobehenic acid, which is obtained by treating erucic acid with hydrogen bromid, is carried out as follows, the parts being by weight:

Example 1.

(a) Twenty-five parts of crystallized chlorid of calcium containing water of crystallization are dissolved in one hundred and twenty parts of hot alcohol, and an excess of gaseous ammonia is passed through the liquid. When the precipitation of ammonium chlorid has been completed, one hundred and thirty parts of alcohol (ninety-two per cent.) are added. It is then cooled to ordinary temperature. To the cold mixture a solution of forty parts of monobromobehenic acid in one hundred and twenty parts of alcohol is slowly added during stirring. The calcium salt of monobromobehenic acid separates out in the shape of a colorless voluminous precipitate. It is filtered off with suction, pressed, washed with alcohol, mixed up by stirring with cold water, filtered off with suction, and subsequently washed with water until the wash-water is free from chlorin. It is then washed with alcohol and dried *in vacuo*. The calcium salt thus obtained is a colorless and tasteless powder almost insoluble in water and alcohol. It has the formula $(C_{22}H_{42}BrO_2)_2Ca$.

(b) The same salt results by the interaction of an alkaline salt of monobromobehenic acid with calcium salts in aqueous solution. For this purpose monobromobehenic acid is dissolved in caustic soda by shaking it at ordinary temperature with highly-diluted caustic soda, (about 1/50 normal.) The calculated quantity of a dilute aqueous solution of chlorid of calcium is added to the solution, and it is stirred until the colorless flocculent precipitate has settled. It is filtered off with suction, washed with water, then with alcohol, and dried *in vacuo*.

(c) One part of bromobehenic acid is shaken at ordinary temperature and for several days with one hundred parts of a saturated aqueous solution of calcium hydroxid. The resulting calcium salt, which still contains small amounts of the free acid, is then heated with alcohol to melt it and carefully mixed up with the liquid by stirring. After cooling, the salt forms a colorless powder, which is filtered off, washed with alcohol, and dried *in vacuo*.

Example 2.

(a) Forty-four parts of crystallized strontium chlorid containing water of crystallization are dissolved in sixty parts of hot water, twelve hundred parts of methylic alcohol are added thereto, and an excess of gaseous ammonia is passed through the liquid. A solution of ninety parts of bromobehenic acid in eight hundred parts of methylic alcohol is then slowly run into the above solution containing the strontium compound while constantly stirring. The precipitated strontium salt is filtered off with suction, washed with methylic alcohol, then carefully with water, and finally again with methylic alcohol, and dried *in vacuo*. It is a colorless tasteless powder which can be kept without suffering decomposition. It has the formula $$(C_{22}H_{42}O_2Br)_2Sr.$$

(b) Monobromobehenic acid is dissolved by shaking it with a little more than the calculated quantity of 1/50 normal aqueous caustic-potash solution. A dilute aqueous solution of chlorid of strontium of a strength which is equivalent to the potash is slowly added while vigorously stirring. The precipitate is then further treated as described under 1 (b).

(c) A solution of four parts of crystallized strontium hydroxid in five hundred parts of water is allowed to flow on ten parts of monobromobehenic acid. It is heated to about 37° centigrade until the acid melts, and the mixture is then vigorously stirred for some days. It is advantageous to heat from time to time to 37° centigrade to melt the acid which has not taken part in the reaction.

To separate the resulting strontium salt from admixed small amounts of unchanged acid, it is filtered off and heated with alcohol until it melts. The salt solidifies while cooling to a solid compound, which is filtered off and dried *in vacuo*.

The alkaline earth of other high-molecular bromin-substituted fatty acids, such as monobromostearic acid, are obtained in analogous manner.

Having now described my invention and in what manner the same is to be performed, what I claim as new, and desire to secure by Letters Patent, is—

1. The herein-described alkaline-earth salts of monobromin-substituted derivatives of high-molecular fatty acids, of the following general formula, in which A E means an alkali earth:

$$\left.\begin{array}{l} C_nH_{2n-2}O_2Br \\ C_nH_{2n-2}O_2Br \end{array}\right\rangle A\ E$$

obtainable by the action of hydrogen bromid on acids of the oleic series and transformation of the resulting compounds into the salts of the alkaline earths, which salts are solid bodies, tasteless, colorless, insoluble in water and being valuable substitutes for potassium bromid, substantially as hereinbefore described.

2. The herein-described calcium salt of monobromobehenic acid of the following formula: $(C_{22}H_{42}O_2Br)_2Ca$, obtainable by treating monobromobehenic acid with calcium hydroxid, which calcium salt is a solid body, tasteless, colorless and insoluble in water and which is a valuable substitute for potassium bromid, substantially as hereinbefore described.

In testimony whereof I have hereunto set my hand in the presence of two subscribing witnesses.

EMIL FISCHER.

Witnesses:
 WOLDEMAR HAUPT,
 HENRY HASPER.